United States Patent
Markov

(10) Patent No.: US 7,752,622 B1
(45) Date of Patent: *Jul. 6, 2010

(54) METHOD AND APPARATUS FOR FLEXIBLE JOB PRE-EMPTION

(75) Inventor: Lev Markov, Burlington, MA (US)

(73) Assignee: Oracle America, Inc., Redwood City, CA (US)

( * ) Notice: Subject to any disclaimer, the term of this patent is extended or adjusted under 35 U.S.C. 154(b) by 1454 days.

This patent is subject to a terminal disclaimer.

(21) Appl. No.: 11/128,655

(22) Filed: May 13, 2005

(51) Int. Cl.
*G06F 9/46* (2006.01)
(52) U.S. Cl. .................. 718/103; 718/102; 718/104
(58) Field of Classification Search .............. 718/100, 718/101, 102, 103, 104, 107; 709/102
See application file for complete search history.

(56) References Cited

U.S. PATENT DOCUMENTS

| | | | |
|---|---|---|---|
| 5,894,572 A | 4/1999 | Martin | |
| 5,954,792 A * | 9/1999 | Balarin | 718/102 |
| 5,995,982 A | 11/1999 | Mercer | |
| 6,154,769 A | 11/2000 | Cherkasova et al. | |
| 6,202,080 B1 | 3/2001 | Lu et al. | |
| 6,370,560 B1 | 4/2002 | Robertazzi et al. | |
| 6,430,593 B1 | 8/2002 | Lindsley | |
| 6,480,876 B2 | 11/2002 | Rehg et al. | |
| 6,539,445 B1 | 3/2003 | Krum | |
| 6,584,488 B1 * | 6/2003 | Brenner et al. | 718/103 |
| 6,986,139 B1 | 1/2006 | Kubo | |
| 7,082,606 B2 | 7/2006 | Wood et al. | |
| 7,159,218 B2 | 1/2007 | Abe et al. | |

(Continued)

OTHER PUBLICATIONS

Feitelson et al. "Theory and Practice in Parallel Job Scheduling", Proceedings of the job scheduling strategies for parallel processing, 1997, pp. 1-34.*

(Continued)

*Primary Examiner*—Meng-Ai An
*Assistant Examiner*—Willy W Huaracha
(74) *Attorney, Agent, or Firm*—Osha • Liang LLP

(57) ABSTRACT

A method for scheduling computing jobs in a scheduling event includes selecting a computing job that is ready for scheduling the first computing job being associated with at least one required resource. A computing node is identified that is able to satisfy the at least one required resource during a first time period having a start time and an end time. A second computing job is determined to have previously been scheduled to execute during a second time period; wherein the second time period overlaps the first time period. At a time prior to scheduling the first computing job, a determination is made as to whether the second computing job is preemptible by the first computing job. If so, execution of the second computing job is preempted by the first computing job if the second computing job has been determined to be preemptible by the first computing job if the priority of the first computing job is greater than the priority of the second computing job by at least a threshold amount, and if preempting the second job frees at least one of the at least one required resource for use by the first computing job. Execution of the first computing job is scheduled to take place on a first computing node during the first time period, where a start time associated with the first time period is a time selected from the group consisting of a current time and a future time.

12 Claims, 5 Drawing Sheets

U.S. PATENT DOCUMENTS

| | | | |
|---|---|---|---|
| 7,281,004 | B2 | 10/2007 | Lightstone et al. |
| 7,448,036 | B2 | 11/2008 | Brenner et al. |
| 2002/0083117 | A1* | 6/2002 | Goddard ............... 709/103 |
| 2002/0194248 | A1* | 12/2002 | Wood et al. ............ 709/102 |
| 2003/0204554 | A1* | 10/2003 | Lake et al. ............. 709/107 |
| 2003/0208521 | A1* | 11/2003 | Brenner et al. ......... 709/103 |
| 2004/0215942 | A1 | 10/2004 | Hansen et al. |
| 2005/0015766 | A1* | 1/2005 | Nash et al. ............. 718/102 |
| 2005/0022187 | A1 | 1/2005 | Park |
| 2005/0149936 | A1* | 7/2005 | Pilkington ............. 718/102 |
| 2005/0229184 | A1 | 10/2005 | Inoue et al. |
| 2005/0234577 | A1 | 10/2005 | Loughran et al. |
| 2007/0050603 | A1 | 3/2007 | Vorbach et al. |
| 2008/0172667 | A1 | 7/2008 | Inoue et al. |

OTHER PUBLICATIONS

P.T. Bulhoes, C. Byun, R. Castrapel, O. Hassaine, "N1™ Grid Engine 6 Features and Capabilities". 2004.

C. Ernemann, V. Hamscher, U. Schwiegelshohn, R. Yahyapour, "On Advantages of Grid Computing for Parallel Job Scheduling". In 2nd International Symposium on Cluster Computing and Grid, pp. 39-46, 2002.

J. Krallmann, U. Schwiegelshohn, R. Yahyapour, "On the Design and Evaluation of Job Scheduling Algorithms". In 5th Workshop on Job Scheduling Strategies for Parallel Processing, pp. 17-42, 1999.

D.G. Feitelson, L. Rudolph, U. Schwiegelshohn, K.C. Sevick, P. Wong, "Theory and practice in Parallel Job Scheduling". In Job Scheduling Strategies for Parallel Processing, pp. 1-34, 1997.

L. Markov; "Graph Optimization Algorithms for Sun Grid Engine"; $2^{nd}$ Grid Engine Workshop; http://gridengine.sunsource.net/download/workshop22-24_09_03/SMI_LevMarkov_GraphOptimizationAlgorithms.pdf; pp. 18; Sep. 2003.

* cited by examiner

METHOD AND APPARATUS FOR FLEXIBLE JOB PRE-EMPTION

CROSS-REFERENCE TO RELATED APPLICATIONS

The present application contains subject matter that may be related to the subject matter in the following U.S. applications filed on May 13, 2005, and assigned to the assignee of the present application: Ser. No. 11/128,802 entitled "Method and Apparatus for Scheduling Computing Jobs in a Computing System"; Ser. No. 11/128,629 entitled "Method and Apparatus for Multidimensional Priority Determination for Job Scheduling"; and Ser. No. 11/128,725 entitled "Method and Apparatus for Job Assignment and Scheduling Using Advance Reservation, Backfilling, and Preemption".

BACKGROUND

The size of computing systems vary from those systems that fit on a desktop and have a few microprocessors to large computing systems that fill large rooms and have specialized electrical and cooling requirements. Such large systems often have as many as 20,000 computing nodes, with each computing node having up to 40 or more central processing units CPUs cooperatively executing computing jobs. Computing nodes are computing entities with various resources that may be used to execute computing jobs.

As computing systems continue to grow in size and complexity, scheduling computing jobs within those computing systems becomes increasingly important, in order to efficiently use the available resources in the system.

Traditionally, scheduling within a computing system includes examining computing jobs in the order the jobs arrive to determine whether the proper resources are available to execute a specific computing job immediately. If sufficient resources are not available to execute the computing job, the computing job is placed in a waiting queue until the required, previously unavailable resources become available. Once the required resources become available, the computing job is removed from the waiting queue and executed on a computing node with the required resources.

SUMMARY

In general, in one aspect, the invention relates to a method for scheduling computing jobs. The method includes selecting a computing job that is ready for scheduling the first computing job being associated with at least one required resource. A computing node is identified that is able to satisfy the at least one required resource during a first time period having a start time and an end time. A second computing job is determined to have previously been scheduled to execute during a second time period; wherein the second time period overlaps the first time period. At a time prior to scheduling the first computing job, a determination is made as to whether the second computing job is preemptible by the first computing job. If so, execution of the second computing job is preempted by the first computing job if the second computing job has been determined to be preemptible by the first computing job if the priority of the first computing job is greater than the priority of the second computing job by at least a threshold amount, and if preempting the second job frees at least one of the at least one required resource for use by the first computing job. Execution of the first computing job is scheduled to take place on a first computing node during the first time period, where a start time associated with the first time period is a time selected from the group consisting of a current time and a future time.

In general, in one aspect, the invention relates to a computing system including multiple computing nodes for executing multiple computing jobs, and a scheduler configured to schedule the multiple computing jobs. Scheduling is accomplished within the computing system by selecting a computing job that is ready for scheduling the first computing job being associated with at least one required resource. A computing node is identified that is able to satisfy the at least one required resource during a first time period having a start time and an end time. A second computing job is determined to have previously been scheduled to execute during a second time period; wherein the second time period overlaps the first time period. At a time prior to scheduling the first computing job, a determination is made as to whether the second computing job is preemptible by the first computing job. If so, execution of the second computing job is preempted by the first computing job if the second computing job has been determined to be preemptible by the first computing job if the priority of the first computing job is greater than the priority of the second computing job by at least a threshold amount, and if preempting the second job frees at least one of the at least one required resource for use by the first computing job. Execution of the first computing job is scheduled to take place on a first computing node during the first time period, where a start time associated with the first time period is a time selected from the group consisting of a current time and a future time.

In general, in one aspect, the invention relates to a computer readable medium having instructions disposed thereon to perform a method. The method comprises: selecting a first computing job that is ready for scheduling from the plurality of computing jobs, wherein the first computing job is associated with at least one required resource; identifying a first computing node able to satisfy at least one resource of the at least one required resource during a first time period; determining that a second computing job has previously been scheduled to execute during a second time period, wherein the second time period overlaps the first time period; determining whether the second computing job is preemptible by the first computing job; preempting execution of the second computing job by the first computing job if the second computing job has been determined to be preemptible by the first computing job; and scheduling execution of the first computing job to take place on the first computing node during the first time period, wherein a start time associated with the first time period is a time selected from the group consisting of a current time and a future time.

Other aspects of the invention will be apparent from the following description and the appended claims.

DETAILED DESCRIPTION

Figure 1:
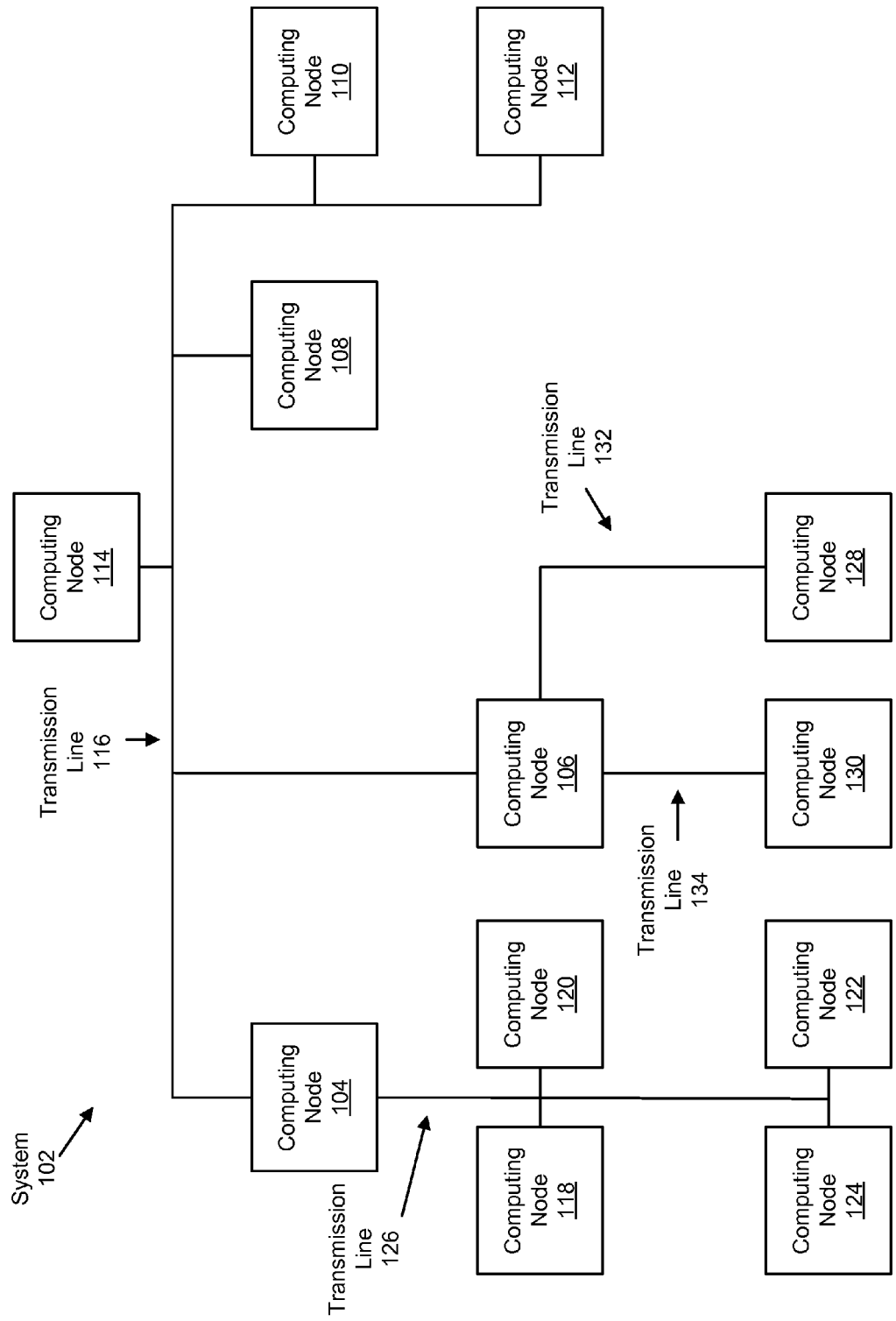
FIG. 1 shows a block diagram of a computing system according to one or more embodiments of the invention.

Exemplary embodiments of the invention will be described with reference to the accompanying drawings. Like items in the drawings are shown with the same reference numbers.

In one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In this specification, it is intended that the term "coupled" describe devices which interact with each other, directly or indirectly. For example, first and second devices that interact with each other through a transmission line between the two devices are directly coupled. Further, first and second devices that have intermediate devices disposed between them, and interact with one another through those intermediate devices, are indirectly coupled. In both situations, the first and second devices are considered coupled.

In general, embodiments of the invention relate to a method and apparatus for scheduling computing jobs. In one or more embodiments of the invention, the method includes selecting a computing job that is ready for scheduling, the first computing job being associated with at least one resource that is required in order for the selected job to properly execute. In one or more embodiments of the invention, the required resources are each characterized as either fixed or floating. A floating resource is one that may be satisfied by moving a resource from one computing node to another, and the fixed resource is one that refers to a resource that is not movable from one computing node to another.

After a computing job is selected for scheduling, a subset of computing nodes is identified that are able to satisfy the at least one required resource during a time period selected for consideration. For each computing node able to satisfy the required resources, a prediction is made of the earliest time the selected computing job can be completed. Future execution of the selected computing job is scheduled to take place on the node having the earliest predicted completion time.

In one or more embodiments of the invention, the computing job selected to be scheduled is a computing job having a higher priority as compared to at least one other computing job ready for scheduling on the computing system.

Scheduling is best understood in the context of an exemplary system such as system 102 of FIG. 1 in which computing nodes are arranged in various configurations.

Computing system 102 includes computing nodes 104, 106, 108, 110, and 112 each coupled to computing node 114 over transmission line 116. Computing nodes 118, 120, 122, and 124 are each coupled to computing node 104 over transmission line 126. Computing nodes 128 and 130 are each coupled to computing node 106 over respective transmission lines 132 and 134.

Throughout this document, reference may be made to parent and child nodes. Such terminology is generally applied to tree structures, and refers to a hierarchy beginning at the "top" of the tree where a topmost node is established having only nodes below it in the tree. A node in the tree which is "above" and directly connected to another node is typically referred to as a parent node, with respect to that lower node. The lower node is typically referred to as a child node with respect to the node directly connected to and above it in the tree. Correspondingly, that same node just described as a child with respect to a node above it in the tree may be referred to as a parent node with respect to nodes immediately directly connected to and below it in the tree.

In some computing systems, such as seen in grid computing, a scheduler within the system receives computing jobs for scheduling, determines an appropriate node able to handle the computing job being scheduled, and asks the appropriate node whether it agrees to execute the computing job. In other systems such as in farm computing, a master scheduler determines the appropriate node to execute a given computing job and assigns the computing job to be executed by that appropriate node. In order to scale to thousands of nodes over an even greater number of processors, regardless of which configuration is used, the process of creating a schedule must be efficient.

In one embodiment of the invention, computing nodes are computing entities with various fixed and floating resources available that may be used to execute one or more computing jobs at any given time. Throughout this document, "fixed resource" refers to resources that are only able to be used by a single node. Examples of fixed resources include central processing units (CPUs) and memory.

A floating resource is a resource that may be moved from one node to another, as needed within the system. Floating resources may be tied to a group of nodes, or may alternatively be movable within the entire computing system, depending on the system design and restrictions that are placed on the given floating resource.

As an example, assume node 116 has three CPUs available to execute computing jobs. Since a CPU cannot be dynamically moved or allocated to a different node, those CPUs are considered fixed resources. However, since a given computing job to be scheduled may additionally require floating resources in order to properly execute, the availability of one or more fixed resources, such as the proper number of CPUs, is only part of the scheduling requirements for those computing jobs. The availability of floating resources also needs to be considered.

Floating resources are available to move between two or more nodes within system 102. In one or more embodiments of the invention, a floating resource may be restricted to a particular set of nodes within the system 102. Other floating resources may be able to be allocated to any of the nodes within the entire computing system 102.

One example of a floating resource is a software license. In one or more embodiments of the invention, a restricted software license "A" is available for use by node 104 and any child node of node 104. Thus, software license "A" is only available for use by nodes 104, 124, 118, 120, and 122.

In a given computing system, such as computing system 102, computing nodes may be similarly configured, may be uniquely configured, or some combination of similarly configured and uniquely configured computing nodes may exist within the system. Thus, different computing nodes may have different numbers and types of CPUs available to execute computing jobs, and may have different memory types and sizes available for use, etc. Persons of ordinary skill in the art having the benefit of this disclosure will readily be aware of how to employ the invention using computing nodes which have different characteristics.

By way of example, node 104 has four CPUs, and 200 Megabytes of memory (e.g., random access memory (RAM), etc.) available for executing computing jobs. However, node 110 is configured with ten CPUs and 2 gigabytes of available memory. Node 108, in this example, has one CPU available, and 5 gigabytes of available memory.

Floating resources may be designated as able to be allocated to any node within computing system 102, or may instead be restricted to a given set of nodes within the system, depending on the resource and any restrictions that may be imposed by the provider of that resource.

In one or more embodiments of the invention, a floating resource includes a particular software license. In one or more embodiments of the invention, a restricted software license "A" is available for use by particular computing nodes, such as computing node 104 and any child node of node 104. Thus, that restricted software license "A" is only available for use by nodes 104, 124, 118, 120, and 122. A different software license "B" may be unrestricted and therefore available for use at any node within system 102.

To effectively provide scheduling services, a master scheduler must be aware of the resources available in the system, and where those resources are allocated at any given time. In one or more embodiments of the invention, a list of resources available in the system is maintained by the master scheduler, together with information regarding where the resource is scheduled to be allocated over a period of time. In one or more embodiments of the invention, a given node maintains a list of resources scheduled to be allocated to that given node over a period of time and makes that information available to the master scheduler, as needed.

Figure 2:
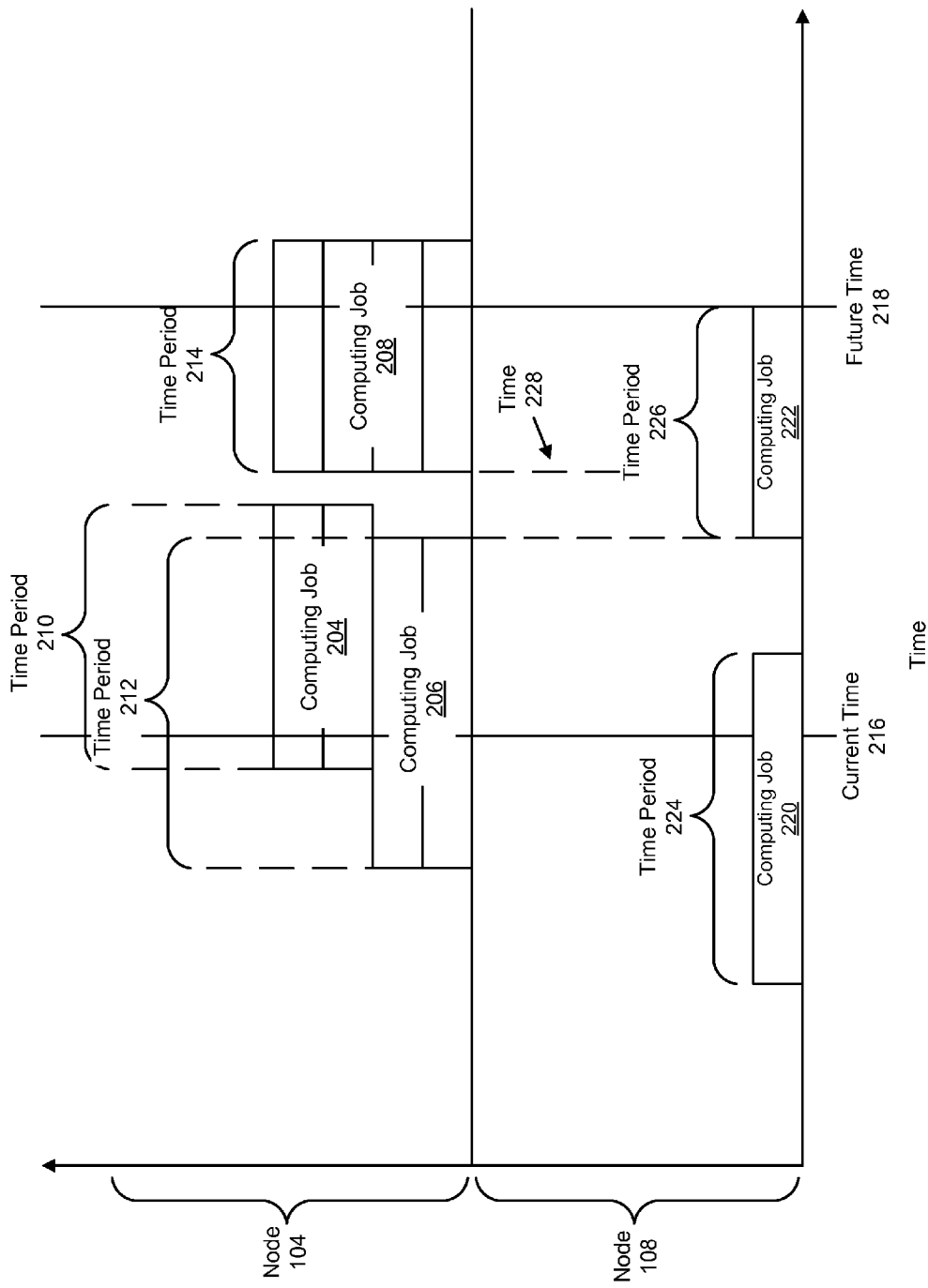
FIG. 2 shows a timeline representing a portion of a schedule according to one or more embodiments of the invention.

FIG. 2 is a timeline representing a portion of a schedule according to one or more embodiments of the invention. Referring to the timeline, computing node 104 and computing node 108 are shown. Computing jobs 204, 206, and 208 are shown executing over time spans 210, 212, and 214 respectively.

In the previous example, node 104 was described as having four CPUs available for executing computing jobs. Continuing with that example, those four CPUs are depicted here as four rows of the timeline, with each row representing a CPU. Computing jobs 204 and 206 are each depicted as using two CPUs, and computing job 208 is shown scheduled to use all four CPUs available on computing node 104.

The horizontal axis of the FIG. 2 timeline represents time, with the current time shown at 216. Scheduling events may be triggered in many ways. In one or more embodiments of the invention, scheduling events are triggered at regular intervals. As an example, a scheduling event is scheduled to take place in the future, at 218. In one or more embodiments of the invention, a scheduling event is triggered when the scheduler is asked to schedule a particularly important computing job.

Also shown in FIG. 2 is a portion of a example schedule for single-CPU node 108. Computing jobs 220 and 222 are shown scheduled to be executed during time periods 224 and 226 respectively.

Computing job 208 is scheduled to be executed beginning at a point in time later than the scheduled completion of computing jobs 204 and 206 which precede computing job 208. A computing job may be introduced into the scheduling cycle at a first time, such as at time 216 but may not be deemed ready for execution until a later time, such as at time 228, because of one or more dependencies associated with one or more other computing jobs, etc. Thus, a computing job must be scheduled to begin execution on or after its ready time.

It is known to those skilled in the art that computing jobs have requirements which are required to be met in order to properly execute on a computing node. It is also known to those skilled in the art that computing jobs have optional criteria which, if met, may result in a reduced overall execution time for the computing job. For example, a given computing job may require at least two CPUs to execute properly, but may be able to be split into two or more pieces that may be executed in parallel.

Splitting a job into pieces that execute in parallel often results in a shorter overall execution time, but the CPU requirement would double to four CPUs.

In the timeline of FIG. 2, computing job 222 is scheduled to execute at a future time when a required resource becomes free following its use during the execution of computing job 206. The resource needed by computing job 222 is a floating resource, and is thus allowed to move between nodes.

The floating resource in this case is limited, because a computing job needing that floating resource is delayed in execution because the floating resource was not immediately available for use. If additional similar floating resources had been available in the system at an earlier time, computing job 222 would have been able to be scheduled to begin execution at an earlier time, assuming all other required resources were also available at an earlier time.

To properly schedule computing jobs to efficiently use system resources, many considerations need to be made as to the availability of resources, the time a computing job is ready for execution, any dependencies a given computing job has to other computing jobs being executed by the system, etc.

Figure 3:
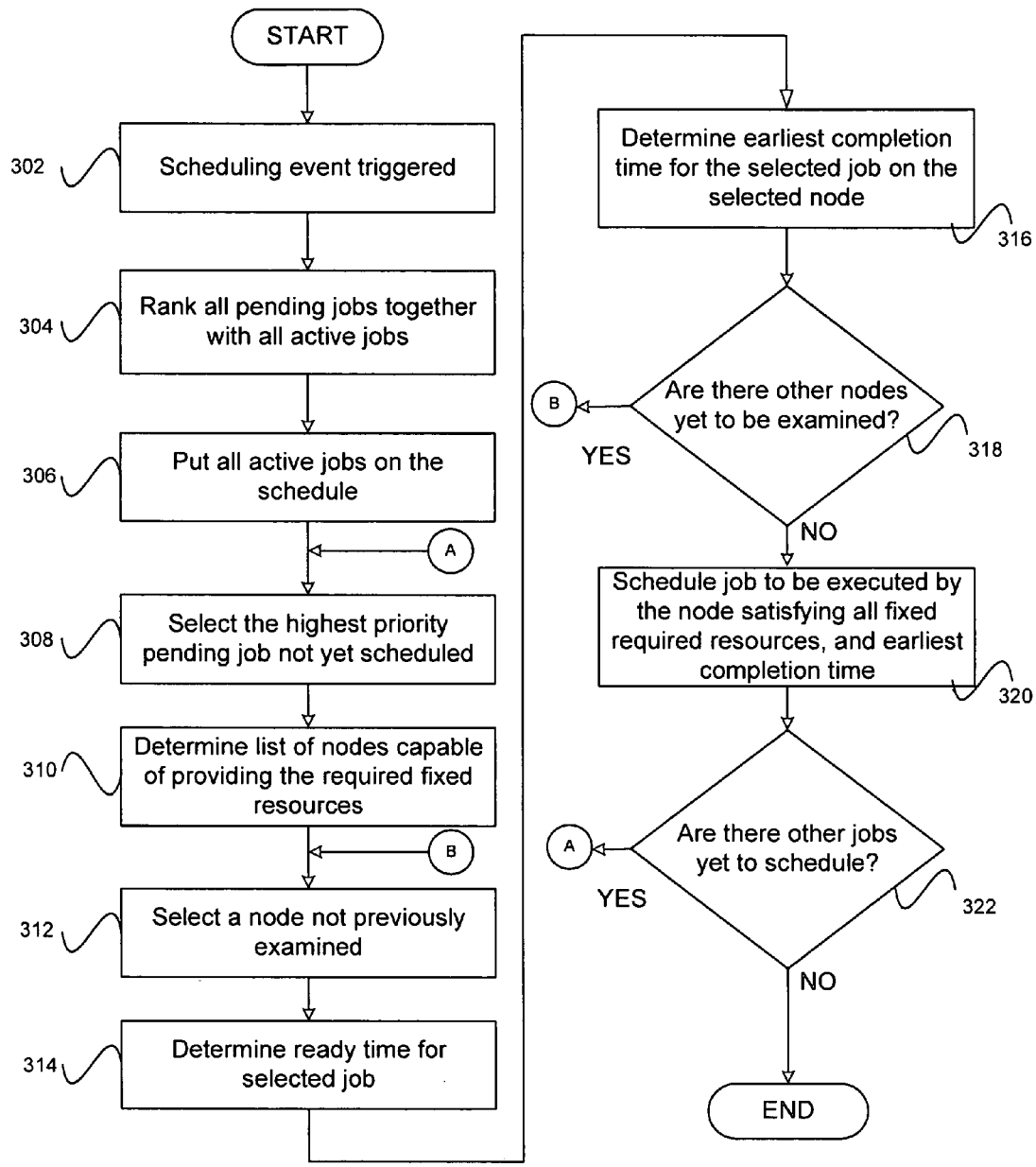
FIG. 3 shows a flowchart of a method for scheduling computing jobs according to one or more embodiments of the invention.

FIG. 3 is a flowchart of a method for scheduling computing jobs according to one or more embodiments of the invention.

At 302, a scheduling event is triggered by the system. As previously discussed, scheduling events may be triggered in many ways. In one or more embodiments of the invention, scheduling events are triggered to take place at regular intervals. In one or more embodiments of the invention, a scheduling event is triggered when an important computing job is ready to be scheduled. Such an important computing job may be designated by assigning the computing job a very high priority as compared to other computing jobs, by indicating its importance in an information field provided for that purpose, or through other means which will be known by persons of ordinary skill in the art.

A scheduling event may also be triggered by elapsed time from a previous scheduling event. By way of example, if a previous scheduling event was triggered to occur as a result of an important computing job becoming available to be scheduled, a next scheduling event may be triggered to take place following a predetermined time interval (e.g., three microseconds, two clock cycles, etc.) from that previous scheduling event.

At 304, in one or more embodiments of the invention, computing jobs that have not yet begun execution (i.e., pending jobs) and currently executing jobs within the system (i.e., active jobs) are ranked in order of priority. In a previous scheduling event, one or more computing jobs may have been previously scheduled to execute at a future time with respect to the scheduling event discussed at 302. In addition, one or more computing jobs may have arrived to be scheduled since the last scheduling event took place. Both of those sets of computing jobs are ranked in order of priority together with active jobs.

When ranking a computing job, consideration is given to initial priority, the time a computing job has been available for scheduling (including any time spent since being scheduled to execute at a future time, if appropriate), and other factors, as appropriate to the system being scheduled, such as dependence on other computing jobs, whether the first computing job is partitionable into two or more executable pieces, preemptability, restartability, and completion deadline. Weighted averages of the various degrees of importance of the various resources as applied to given jobs are computed. The results of those computations are used to rank the various computing jobs.

By way of example, in one or more embodiments of the invention, static priority is computed using the following $$S_i = \alpha\left(\frac{U_i}{U_{max} - U_{min}}\right) + \beta\left(\frac{P_i}{P_{max} - P_{min}}\right)$$

where i is an index associated with a given computing job available for scheduling, U represents static urgency (discussed below), P represents the initial priority assigned the job.

and

α and β are weighting factors designating the importance of the associated factor.

The particular value for static urgency may depend on a number of factors, such as what originated the job, the length of time the job has been waiting for execution, etc.

Computation of urgency is based on the various levels of importance associated with the values of various optimization parameters calculated for by the various computing jobs available for scheduling. Urgency for a given job to be scheduled is a weighted average of the various degrees of importance assigned to each optimization parameter calculated for that given job as shown by the following formula.

$$U_i = \sum_{j=1}^{J} \alpha_j^{adj} f(i, j)$$

where j is an optimization parameter calculated for job i $\alpha_j^{adj}$ the adjusted importance of a resource j and $f(i, j)$ represents a value associated with a optimization parameter j, calculated for a job i The functions $f(i, j)$ are optimization parameter dependant, and may be determined by systems designers as appropriate. In one embodiment of the present invention, the function representing the memory requirement for a given job is $$f(i, memory) = \frac{memory_{min\,req'd} + memory_{max\,req'd}}{2}$$

Thus, with respect to the memory requirement for a given job, $f(i, j)$ is replaced by the average memory required to properly execute the given job.

Other function values include the average number of CPUs used for a given job, the amount of time a job has been waiting for execution, the average execute time expected for this job over differently configured nodes, etc.

$\alpha_j^{adj}$ represents an adjusted value of an initially specified $\alpha_j$. $\alpha_j^{adj}$ is computed using $$\alpha_j^{adj} = \frac{\min(1 \leq j \leq J)\left\{\alpha_j\left(\frac{f(i,j)^{max} - f(i,j)^{min}}{f(i,j)^{max}}\right)\right\}}{\alpha_j}$$

At 306, all active jobs are placed on the schedule in their current positions, including the node where those active jobs are currently executing and within the time periods those active jobs are expected to occupy during execution.

At 308, a pending computing job which has not yet been considered for scheduling during this scheduling event is selected for scheduling. In one or more embodiments of the invention, the selected pending computing job is the highest ranked computing job in the set of computing jobs ranked at 304 that has not yet been scheduled.

At 310, a list of nodes is compiled of those nodes capable of providing the fixed resources required to execute the job being scheduled. Compiling the list is accomplished by comparing the fixed resources available at each node against the resource requirements for the job being scheduled.

At 312, a node not previously examined for scheduling this particular job in this particular scheduling event is chosen from the list of nodes developed at 310. At 314, the ready time for the computing job selected is determined for the node selected at 312. As previously discussed, the ready time of a computing job is when all dependencies on other computing jobs are expected to be satisfied. Thus, if the selected computing job needs results from a previously scheduled computing job in order to execute properly, then the ready time of the selected computing job is no earlier than the time those results are expected to become available.

At 316, the earliest completion time is determined for the selected job on the selected node. This earliest completion time takes into account the predicted execution time of the job, the ready time of the job, as well as the time periods within which resources needed for job execution are available. Additional details, with respect to determining an earliest completion time for given node will be presented later. The earliest completion time determined at 316 is noted for later comparison with earliest completion times associated with other nodes for the same job in order to determine which node receives this job and the time period within which this job executes on that node.

At 318, it is determined whether all nodes capable of providing the required fixed resources have been examined to determine an earliest completion time for this job on those nodes. If there are nodes capable of providing the required fixed resources which had not been examined to determine an earliest completion time for this job, then the method proceeds again at 312, where a new node is selected for examination.

If, at 318, there are no other nodes yet to be examined, the method proceeds at 320 where the node having the earliest completion time for the selected job is selected for scheduling. At this time the selected job is scheduled to be executed by the node having the earliest completion time. The time period in which the job is scheduled begins at a time preceding that earliest completion time by an amount approximately equal to the estimated execution time.

At 322, it is determined whether there are other jobs to schedule during this scheduling event. If yes, the method proceeds at 308 where the next highest priority job not yet scheduled is selected for scheduling. If, at 322, there are no jobs left to schedule in this scheduling event, the method ends.

As mentioned at 316, the earliest completion time for the selected job on a particular node is determined. Persons of ordinary skill in the art having the benefit of this disclosure will readily be aware that the earliest completion time may be determined in many ways. One such way is detailed below, and introduces the concepts of job preemption, advance reservation, and backfilling.

Figure 4:
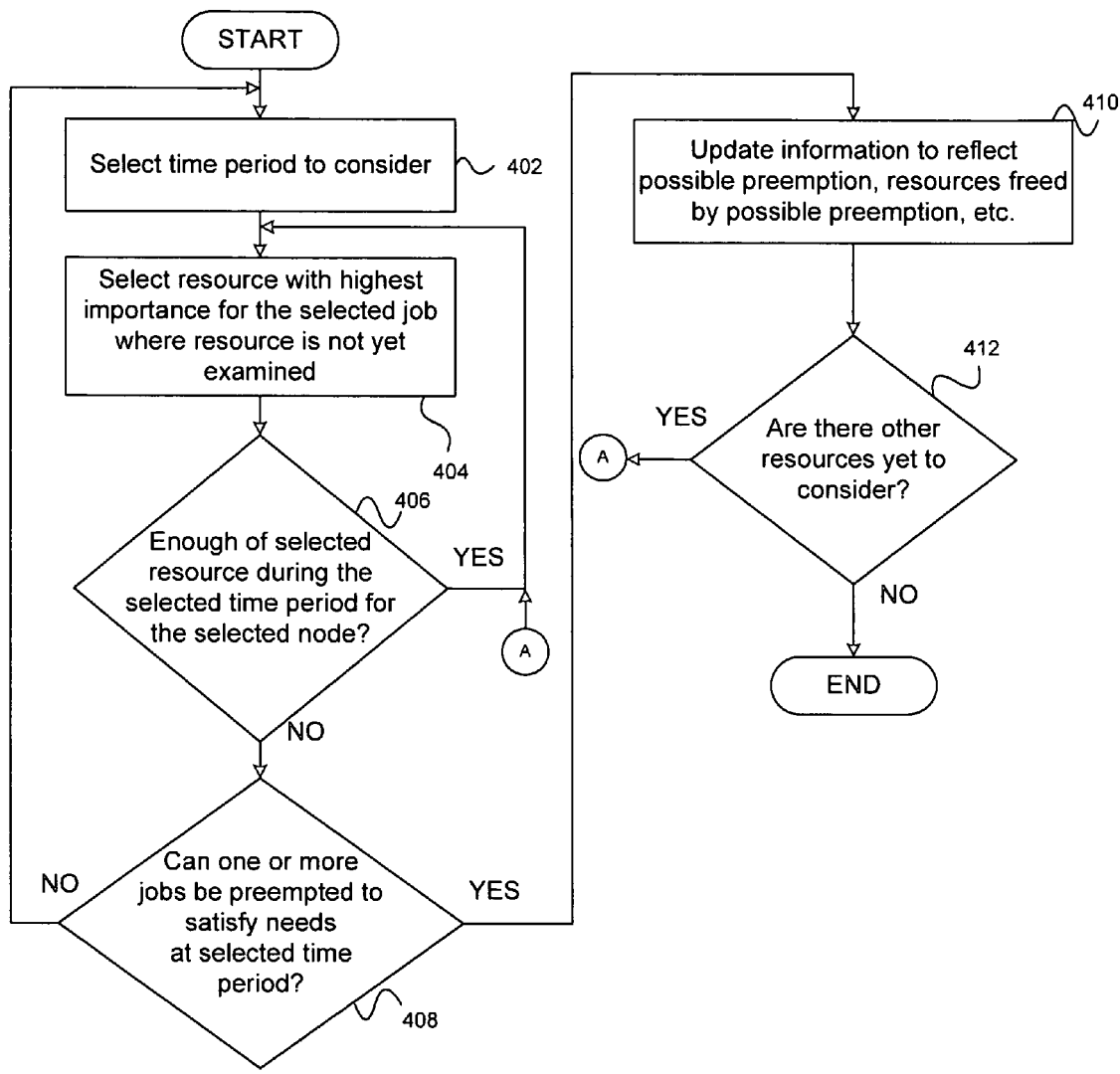
FIG. 4 shows a flowchart of a method according to one or more embodiments of the invention.

FIG. 4 is a flowchart of a method according to one or more embodiments of the invention.

Although it is expected that the following method for determining earliest completion time may be performed in conjunction with the method previously described with respect to FIG. 3, this method for determining earliest completion time may be performed for other reasons as well. Therefore, this method is not restricted to determining earliest completion time with respect to scheduling jobs in order of priority.

At 402, a time period is selected for consideration. In one embodiment of the invention, the time period should begin on or after the time when the job being scheduled is expected to be ready for execution. The length of the time period selected for consideration should be approximately the same length as the expected execution time of the job being scheduled.

At 404, the resources needed for the selected job are reviewed to determine which of those resources is the most important as compared to all other resources needed for the selected job, and which resource has not yet been examined during this scheduling event for this job. At this time, that most important resource is selected for examination. If it is deemed beneficial to a system designer employing the present invention, the resources required to properly execute the selected computing job may optionally be ranked as to their relative importance to each other prior to 404. Resources that cost more, or which are more scarce, for example, may have higher ranking than others costing less, or being less scarce.

In one or more embodiments of the invention, a first resource is more important than a second resource if the first resource is more costly than the second resource. In one or more embodiments of the invention, a first resource is more important than a second resource if the first resource is less available than the second resource. The importance of a resource to the selected job may be provided to the scheduler in FIG. 1, or may be determined automatically, using a computation similar to that discussed earlier with respect to static priority.

At 406, it is determined whether a sufficient amount of the selected resource is uncommitted and therefore freely available within the system during the selected time period, for the node being examined. If yes, the method proceeds at 404 where the next most important resource not yet considered is selected.

If a sufficient amount of the selected resource remains uncommitted to a job and therefore freely available within the system during the selected time period, it may be possible to free enough resources by preempting lower priority jobs on this node or another node within the system.

If a sufficient amount of the selected resource does not remain uncommitted and freely available within the system to execute the selected job during the selected time period, the method proceeds at 408 where a determination is made whether one or more jobs may be preempted in order to satisfy resource needs for the job being scheduled during the selected time period.

When considering whether a given resource is available, resources needed for execution of any already scheduled job are considered to be committed, including those resources required to execute jobs that are already scheduled to execute on the selected node. However, although jobs on the selected node may consume resources, those jobs are considered for preemption just like other jobs being executed on other nodes during the selected time period.

Persons of ordinary skill in the art having the benefit of this disclosure will readily understand how to determine, using the rules of the system employing the invention, whether jobs may be preempted to free up enough of the required resources to satisfy the resource needs of the job being scheduled during the selected time period. Details of one such method is described below.

If, at 408, not enough resources are available to be freed up by preempting jobs during the selected time period, the method proceeds again at 402, where a new time period is selected for consideration. If however, at 408, enough resources may be freed by preempting one or more jobs according to criteria set forth within the system, the method proceeds at 410 where scheduling and resource information within the system is updated to reflect the one or more possible preemptions, resources freed by the one or more preemptions, etc.

Recall that, at 404, the highest importance resource needed for the job being examined is selected for consideration. At 408, a determination was made that one or more jobs may be preempted to satisfy that important resource need selected at 404. At this stage, we have taken notice of one or more jobs that may be preempted in order to satisfy the resource need selected at 404. If those one or more jobs are actually preempted, it is likely that the preemption frees resources other than the resource selected at 404.

At 412, a determination is made whether there are other resources yet to consider in order to satisfy the resource needs of the selected job. If yes, the method proceeds again at 404, where the next highest important resource needed for the selected job which has not yet been considered is selected for examination. If however, all of the resources needing to be considered in order to satisfy the resource needs for the selected job have been considered, the method ends.

In a scheduling scenario such as being discussed here, the ability to preempt already executing jobs and previously scheduled jobs plays a key role. As previously discussed, jobs currently executing and jobs already on the schedule in a particular time period and allocated to a particular node for execution each consume resources on those nodes during those particular time periods.

Whether a job may be preempted from its current position on the schedule depends on a number of factors. Such factors include, but are not limited to, the priority of the job being considered for preemption as compared to the job attempting to preempt, the amount of time a currently executing job being considered for preemption has been executing as compared to its expected total time of execution, whether the job being considered for preemption may be broken into several smaller jobs, whether the job attempting to preempt may be broken into several smaller jobs, etc.

Figure 5:
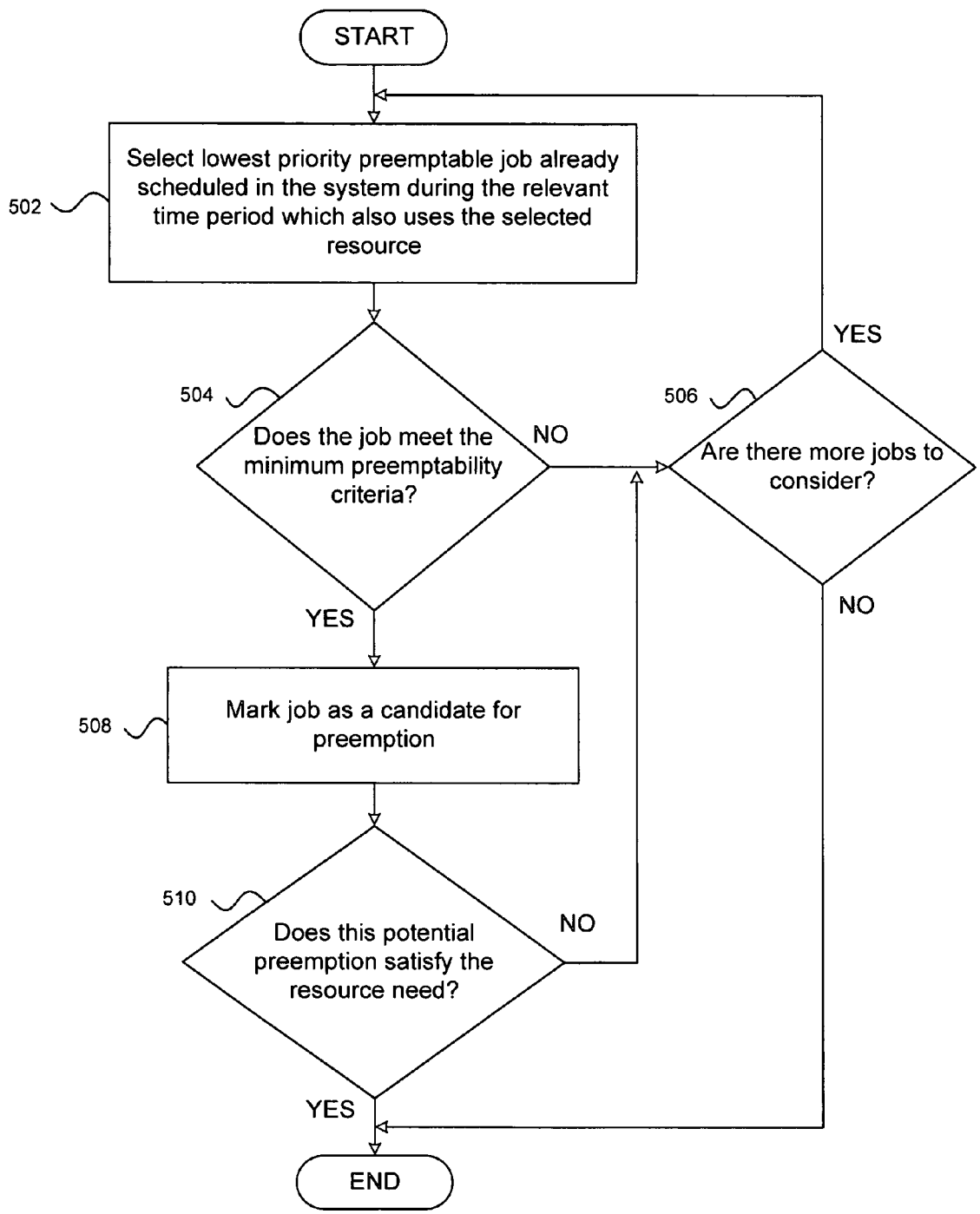
FIG. 5 shows a flowchart of a method according to one or more embodiments of the invention.

FIG. 5 is a flowchart of a method according to one or more embodiments of the invention. To execute this method, it is anticipated that a system has identified a job to be scheduled together with a resource need that has not yet been satisfied for a particular time period.

At 502, the lowest priority preemptible job already scheduled in the system during the relevant time period, whether currently executing or not, and which uses the desired resource, is selected for preemption consideration.

At 504, a determination is made whether the selected job meets minimum preemptability criteria within the system. Computing jobs considered for preemption include computing jobs that are already executing as well as computing jobs that are scheduled to execute at a future time. Thus, each of the computing jobs shown in FIG. 2, such as computing jobs 204, 206, 208, 220, and 222 may be considered for preemption. Not all of those jobs will be eligible for preemption, however, for reasons that may be different for each job.

In one or more embodiments of the invention, the importance of the first job is compared with the importance of the second job to determine, at 504, whether the static priority of the second computing job is greater than that of the first computing job.

In one or more embodiments of the invention, the first computing job is not preempted by a second computing job unless the static priority of the second computing job is substantially greater than the static priority of the first computing job. A system, such as system 102 of FIG. 1, may set a priority threshold for preemptability for one or more computing nodes in the system.

By way of example, recall that the scarcity of a floating resource necessitated scheduling computing job 222 to begin execution once computing job 206 completed. When computing job 222 was scheduled using the present invention, computing job 206 was examined for preemptability. Assume that the priority of computing job 222 is ranked at 54 on a scale of 1 to 100. If the system has a simple criteria for preemptability requiring that a first job only have a greater priority in order to preempt a second job, computing job 222 preempts computing job 206 if the priority of computing job 206 is less than 54.

In a different system having a higher preemptability criteria requiring that a preempting job have a priority at least 50 percent higher than the job being preempted, computing job 222 does not preempt computing job 206 unless computing job 206 had a priority of 36 or below.

A second example of possible preemptability criteria include whether a presently executing job may be broken into several different pieces for execution. If a computing job being examined is capable of be broken into multiple pieces, it is possible that a first piece may execute to completion, with second and later pieces being scheduled to execute at a later time, on the same computing node or a different computing node.

In one or more embodiments of the invention, some computing jobs may be broken into multiple executable pieces that are executed one after another in succession. Those multiple executable pieces need not execute immediately one after another, so long as they execute in the required order. Such a required order may, for example, be dictated by data dependencies between the different executable pieces. In a job that may be broken into different pieces for execution, data dependencies may not exist between the different pieces, making it possible for multiple pieces of the same job to concurrently execute. In one or more embodiments of the invention, a determination is made whether a computing job is able to be broken into multiple, individually executed pieces, two or more of which may concurrently execute.

A third example of preemptability criteria includes a determination of whether the computing job being considered for preemption has been executing longer or shorter than respective predetermined threshold percentages of its total expected execution time. Persons of ordinary skill in the art having the benefit of this disclosure will readily recognize that it is inefficient to preempt a computing job that is already executing unless the computing job has proceeded beyond a point where the importance of the resources freed by the preemption is outweighed by the cost of the resources already expended plus the cost of the resources consumed by reexecuting the preempted computing job in its entirety.

If, at 504, the execution priority of the first computing job as compared to the second computing job does not meet the priority criteria, or other criteria deemed necessary for preemption are not met, the method proceeds at 506 where it is determined whether there are other jobs to consider for preemption. If other jobs exist consider for preemption, the method proceeds again at 502. If, at 506, no other jobs exist to consider for preemption, the method ends.

If, at 504, the criteria for preemption are deemed met, the method proceeds at 508 where the job is marked as a strong candidate for preemption by the selected job. At 510, a determination is made whether preempting the job selected at 502 satisfies the remaining resource needs of the job being scheduled. If no, the method proceeds at 506 to determine whether other jobs may be considered for preemption. If yes, the method ends.

One factor that often needs to be considered when scheduling computing jobs across many computing nodes is whether a given computing node needs to be "cleaned" prior to executing particular computing jobs. Cleaning a computing node involves security related operations designed to ensure that no process remnants or data remnants are left behind after a prior job has completed execution that the owner of the prior job might consider to be sensitive. Persons of ordinary skill in the art having the benefit of this disclosure will readily be aware of cleaning operations that may be necessary in a given situation.

For example, if a computing node is scheduled to execute a first computing job "owned" by Company A, that computing node may need special operations performed on it to "clean" the computing node prior to executing a second computing job "owned" by Company B, a competitor of Company A.

In one or more embodiments of the invention, whichever entity keeps a master schedule for a node requiring cleaning prior to executing the job owned by Company B ensures that additional time is added either to the end of the Company A job or to the beginning of the Company B job, in order to be able to satisfy the cleaning requirement.

Another factor that needs to be considered when scheduling computing jobs is time that may be required in order to prepare a node for executing a given computing job. For example, if a computing job being scheduled requires a particular operating system be running on whichever node that will execute that job, time may need to be provided in order to convert the operating system to the proper operating system, if the operating system being execute at the desired node is not the operating system needed by the succeeding computing job.

The invention provides a method and apparatus for efficiently scheduling computing jobs so that the utility of system resources is maximized. By prioritizing the incoming computing jobs and then selecting for scheduling those computing jobs in order of priority, the invention ensures that computing jobs are given the most opportunities to be selected to be scheduled on the best nodes during the best time intervals according to the importance of that computing job relative to other computing jobs ready for scheduling.

By allowing a job to be scheduled in the future (i.e., a process called forward scheduling) computing nodes are at a high level of utilization. By allowing preemption to take place, important jobs are executed at a time determined according to the job priorities. Finally, by examining the various times when resources on each appropriate computing node will be available, jobs are able to be backfilled into positions in the schedule which may be prior to other more important jobs that are delayed due to the unavailability of resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scheduling computing jobs comprising:

receiving a plurality of computing jobs for scheduling on a computing system comprising a plurality of heterogeneous computing nodes, wherein the plurality of computing jobs comprises a plurality of initial priorities and a plurality of resource requirements, and wherein the plurality of heterogeneous computing nodes comprises a plurality of resources;

calculating, based on the plurality of resource requirements and the plurality of resources, a plurality of urgency values for the plurality of computing jobs;

identifying a maximum value and a minimum value of the plurality of urgency values;

calculating a static urgency for a first computing job by dividing an urgency value for the first computing job by a difference between the maximum value and the minimum value of the plurality of urgency values;

adding, after calculating, an initial priority of the first computing lob and the static urgency for the first computing job to create a static priority for the first computing job;

selecting, from the plurality of computing jobs, the first computing job, wherein the static priority of the first computing job exceeds a static priority of a second computing job in the plurality of computing jobs;

identifying a first computing node of the plurality of heterogeneous computing nodes able to satisfy a resource requirement of the first computing job during a first time period;

determining that a third computing job has previously been scheduled to execute during a second time period, wherein the second time period overlaps the first time period;

determining, based on a preemption factor, whether the third computing job is preemptible by the first computing job;

preempting execution of the third computing job by the first computing job after determining the third computing job is preemptible; and scheduling execution of the first computing job to take place on the first computing node during the first time period.

2. The method of claim 1, wherein the preemption factor comprises: whether the third computing job has been designated as not being preemptible, whether the static priority of the first computing job is higher than a static priority of the third computing job by at least a static priority threshold amount, whether the third computing job has been executing longer than a execution threshold amount of time, whether the third computing job has more than a threshold amount of time left to execute before execution is completed, whether the third computing job is partitionable.

3. The method of claim 2, wherein attributes individually adjustable through user input received by at least one computing node within a plurality of computing nodes include at least one selected from the group consisting of the static priority of the first computing job, the static priority of the third computing job, the static priority threshold amount, and the execution threshold amount of time.

4. The method of claim 1, wherein the resource requirement of the first computing job comprises at least one resource selected from the group consisting of a processor type, a supporting software, and a specified memory size.

5. The method of claim 1, wherein the first computing job is characterized by at least one selected from the group consisting of dependence on other computing jobs, whether the first computing job is partitionable, preemptability, restartability, and completion deadline.

6. A computing system comprising:

a plurality of heterogeneous computing nodes for executing a plurality of computing jobs, wherein the plurality of heterogeneous computing nodes comprises a plurality of resources; and a scheduler configured to schedule the plurality of computing jobs by:

receiving the plurality of computing jobs comprising a plurality of initial priorities and a plurality of resource requirements;

calculating, based on the plurality of resource requirements and the plurality of resources, a plurality of urgency values for the plurality of computing jobs;

identifying a maximum value and a minimum value of the plurality of urgency values;

calculating a static urgency for a first computer job by dividing an urgency value for the first computing job by a difference between the maximum value and the minimum value of the plurality of urgency values;

adding, after calculating, the initial priority of the first computing job and the static urgency for the first computing job to create a static priority for the first computing job;

selecting, from the plurality of computing jobs, the first computing job, wherein the static priority of the first computing job exceeds a static priority of a second computing job in the plurality of computing jobs;

identifying a first computing node of the plurality of heterogeneous computing nodes able to satisfy the resource requirement of the first computing job during a first time period;

determining that a third computing job has previously been scheduled to execute during a second time period, wherein the second time period overlaps the first time period;

determining, based on a preemption factor, whether the third computing job is preemptible by the first computing job;

preempting execution of the third computing job by the first computing job after determining the third computing job is preemptible; and scheduling execution of the first computing job to take place on the first computing node during the first time period.

7. The system of claim 6, wherein determining the preemption factor comprises: whether the third computing job has been designated as not being preemptible, whether the static priority of the first computing job is higher than the static priority of the third computing by at least a static priority threshold amount, whether the third computing job has been executing longer than a execution threshold amount of time, whether the third computing has more than a time threshold amount of time left to execute before execution is completed, and whether the third computing job is partitionable.

8. The system of claim 6, wherein the static priority of the first computing job and the static priority of the third computing job are individually adjustable through user input received by at least one computing node within a plurality of computing nodes, wherein the first computing node is one of the plurality of computing nodes.

9. The system of claim 6, wherein the resource requirement of the first computing job comprises at least one resource selected from the group consisting of a processor type, a supporting software, and a specified memory size.

10. The system of claim 6, wherein the first computing job is characterized by at least one selected from the group consisting of dependence on other computing jobs, whether the first computing job is partitionable, preemptability, restartability, and completion deadline.

11. A non-transitory computer readable medium having instructions disposed thereon to perform a method comprising:
- receiving a plurality of computing jobs for scheduling on a computing system comprising a plurality of heterogeneous computing nodes, wherein the plurality of computing jobs comprises a plurality of initial priorities and a plurality of resource requirements, and wherein the plurality of computing nodes comprises a plurality of resources;
- calculating, based on the plurality of resource requirements and the plurality of resources, a plurality of urgency values for the plurality of computing jobs;
- identifying a maximum value and a minimum value for the plurality of urgency values;
- calculating a static urgency for a first computing job by dividing an urgency value for the first computing job by a difference between the maximum value and the minimum value of the plurality of urgency values;
- adding, after calculating, an initial priority for the first computing job and the static urgency for the first computing job to create a static priority for the first computing job;
- selecting, from the plurality of computing jobs, the first computing job, wherein the static priority of the first computing job exceeds a static priority of a second computing job in the plurality of computing job;
- identifying a first computing node of the plurality of heterogeneous computing nodes able to satisfy a resource requirement of the first computing job during a first time period;
- determining that a third computing job has previously been scheduled to execute during a second time period, wherein the second time period overlaps the first time period;
- determining, based on a preemption factor, whether the third computing job is preemptible by the first computing job based on a factor;
- preempting execution of the third computing job by the first computing job after determining the third computing job is preemptible; and
- scheduling execution of the first computing job to take place on the first computing node during the first time period.

12. The non-transitory computer readable medium of claim 11, wherein the preemption factor comprises: whether the third computing job has been designated as not being preemptible, whether the static priority of the first computing job is higher than the static priority of the third computing by at least a static priority threshold amount, whether the third computing job has been executing longer than a execution threshold amount of time, whether the third computing has more than a time threshold amount of time left to execute before execution is completed, and whether the third computing job is partitionable.

* * * * *

UNITED STATES PATENT AND TRADEMARK OFFICE
CERTIFICATE OF CORRECTION

| | | |
|---|---|---|
| PATENT NO. | : 7,752,622 B1 | Page 1 of 1 |
| APPLICATION NO. | : 11/128655 | |
| DATED | : July 6, 2010 | |
| INVENTOR(S) | : Lev Markov | |

It is certified that error appears in the above-identified patent and that said Letters Patent is hereby corrected as shown below:

IN THE CLAIMS:

In claim 1, column 13 (line 18), the word "lob" should read -- job --.

Signed and Sealed this

Seventh Day of September, 2010

David J. Kappos
*Director of the United States Patent and Trademark Office*